US009133394B2

(12) United States Patent
Freeman et al.

(10) Patent No.: US 9,133,394 B2
(45) Date of Patent: Sep. 15, 2015

(54) POLYHEDRAL OLIGOMERIC SILSESQUIOXANE NANOCRYSTAL STABILIZATION LIGANDS

(71) Applicant: Nanosys, Inc., Milpitas, CA (US)

(72) Inventors: William P. Freeman, San Mateo, CA (US); Paul T. Furuta, Sunnyvale, CA (US); Robert Dubrow, San Carlos, CA (US); J. Wallace Parce, Palo Alto, CA (US)

(73) Assignee: Nanosys, Inc., Milpitas, CA (US)

( * ) Notice: Subject to any disclaimer, the term of this patent is extended or adjusted under 35 U.S.C. 154(b) by 0 days.

(21) Appl. No.: 14/208,079

(22) Filed: Mar. 13, 2014

(65) Prior Publication Data
US 2014/0275598 A1 Sep. 18, 2014

Related U.S. Application Data

(60) Provisional application No. 61/781,392, filed on Mar. 14, 2013.

(51) Int. Cl.
*C07F 7/10* (2006.01)
*C09K 11/88* (2006.01)
*C09K 11/02* (2006.01)

(52) U.S. Cl.
CPC ............. *C09K 11/883* (2013.01); *C09K 11/025* (2013.01)

(58) Field of Classification Search
CPC .............................. C09K 11/02; C09K 11/883
USPC ......................................................... 556/419
See application file for complete search history.

(56) References Cited

U.S. PATENT DOCUMENTS

| 6,207,229 | B1 | 3/2001 | Bawendi et al. |
| 6,225,198 | B1 | 5/2001 | Alivisatos et al. |
| 6,322,901 | B1 | 11/2001 | Bawendi et al. |
| 6,861,155 | B2 | 3/2005 | Bawendi |
| 6,872,249 | B2 | 3/2005 | Peng et al. |
| 6,949,206 | B2 | 9/2005 | Whiteford et al. |
| 7,267,865 | B2 | 9/2007 | Hetzler et al. |
| 7,374,807 | B2 | 5/2008 | Parce et al. |
| 7,572,393 | B2 | 8/2009 | Whiteford et al. |
| 7,750,235 | B2 | 7/2010 | Scher et al. |
| 8,053,972 | B2 | 11/2011 | Bawendi et al. |
| 2004/0068074 | A1* | 4/2004 | Yoshida et al. ................. 528/10 |
| 2006/0040103 | A1 | 2/2006 | Whiteford et al. |
| 2006/0052623 | A1* | 3/2006 | Yoshida et al. ............... 556/450 |
| 2006/0058488 | A1* | 3/2006 | Kuhnle et al. .................. 528/37 |
| 2008/0118755 | A1 | 5/2008 | Whiteford et al. |
| 2010/0167011 | A1 | 7/2010 | Dubrow |
| 2012/0113672 | A1 | 5/2012 | Dubrow et al. |
| 2013/0043433 | A1 | 2/2013 | Liu et al. |

OTHER PUBLICATIONS

Wada et al., Applied Catalysis A: 356 (2009) 72-79.*
Wada et al., Applied Catalysis A 356:72-79 (2009).*
Alivisatos, A.P, "Semiconductor Clusters, Nanocrystals, and Quantum Dots," Science 271:933-937 (1996).
Gnanasekaran, D., et al., "Developments of polyhedral oligomeric silsesquioxanes (POSS), POSS nanocomposites and their applications: A review," J. Sci. Ind. Res. 68:437-464 (2009).
Murray, C.B., et al., "Synthesis and Characterization of Nearly Monodisperse CdE (E=S, Se, Te) Semiconductor Nanocrystallites," J. Am. Chem. Soc. 115(19):8706-8715 (1993).
Peng, X., et al., "Epitaxial growth of highly luminescent CsDe/CdS core/shell nanocrystals with photostability and electronic accessibility," J. Am. Chem. Soc. 119(30):7019-7029 (1997).
Shockey, E.G., et al., "Functionalized Polyhedral Oligosilsesquioxane (POSS) Macromers: New Grafable POSS Hydride, POSS α-Olefin, POSS Epoxy, and POSS Chlorosilane Macromers and POSS-Siloxane Triblocks," Appl. Organometal. Chem. 13:311-327 (1999).
International Search Report and Written Opinion for PCT/US2014/025486, dated Jul. 10, 2014, 8 pages.

* cited by examiner

*Primary Examiner* — Porfirio Nazario Gonzalez
*Assistant Examiner* — Kofi Adzamli
(74) *Attorney, Agent, or Firm* — Sterne, Kessler, Goldstein, Fox P.L.L.C.

(57) ABSTRACT

Quantum-dot binding ligands with silsesquioxane moieties are provided. The quantum-dot binding ligands include a multiplicity of amine or carboxy binding ligands in combination with silsesquioxane moieties providing improved stability for the ligated quantum dots. The ligands and coated nanostructures of the present invention are useful for close packed nanostructure compositions, which can have improved quantum confinement and/or reduced cross-talk between nanostructures.

20 Claims, 1 Drawing Sheet

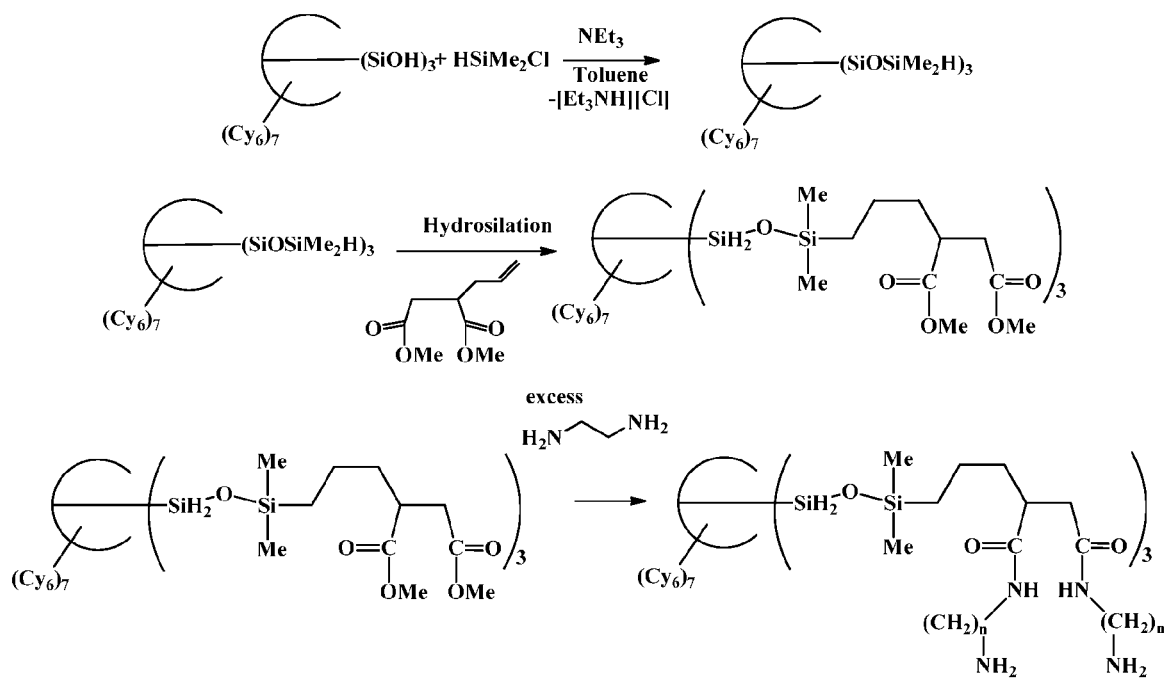

POLYHEDRAL OLIGOMERIC SILSESQUIOXANE NANOCRYSTAL STABILIZATION LIGANDS

CROSS-REFERENCES TO RELATED APPLICATIONS

This application claims priority to U.S. Provisional Application No. 61/781,392, filed Mar. 14, 2013, which is incorporated in its entirety herein for all purposes.

BACKGROUND OF THE INVENTION

High performance down-converting phosphor technologies will play a prominent role in the next generation of visible light emission, including high efficiency solid-state white lighting (SSWL). In addition, such technologies are also applicable to near infrared (NIR) and infrared (IR) light emitting technologies. Down-conversion from ultraviolet (UV) or blue light emitting semiconductor light emitting diodes (LEDs) into blue, red and green wavelengths offers a fast, efficient and cost-effective path for delivering commercially attractive white light sources. Unfortunately, existing rare-earth activated phosphors or halophosphates, which are currently the primary source for solid-state down-conversion, were originally developed for use in fluorescent lamps and cathode ray tubes (CRTs), and therefore have a number of critical shortfalls when it comes to the unique requirements of SSWL. As such, while some SSWL systems are available, poor power efficiency (<20 light lumens/watt (lm/W)), poor color rendering (Color Rendering Index (CRI)<75) and extremely high costs (>$200/kilolumen (klm)) limit this technology to niche markets such as flashlights and walkway lighting.

Furthermore, LEDs often suffer from reduced performance as a result of internal reflection of photons at the chip/coating interface. Typically, LEDs are encapsulated or coated in a polymeric material (which may comprise phosphors) to provide stability to the light-emitting chip. Currently these coatings are made by using an inorganic or organic coating that has a very different refractive index than the base material (i.e., the chip), which results in a detrimental optical effect due to the refractive index mismatch at the interface between the two materials. In addition, the temperature of the LED can reach in excess of 100° C. To allow for the expansion and contraction that can accompany this temperature rise, a compliant polymeric layer (e.g., silicone) is often placed in contact with the chip. In order to provide additional stability to the LED, this compliant layer is often further coated with a hard shell polymer.

The resulting LED structure suffers loss of light at the chip/compliant polymer interface due to the lower refractive index of the polymer coating in relation to the LED. However, if the refractive index of the compliant layer is increased, even greater loss will occur due at the high refractive index/low refractive index interface between the compliant polymer and the hard shell polymer due to internal reflection.

There are several critical factors which result in poor power efficiencies when using traditional inorganic phosphors for SSWL. These include: total internal reflection at the LED-chip and phosphor layer interface resulting in poor light extraction from the LED into the phosphor layer; poor extraction efficiency from the phosphor layer into the surroundings due to scattering of the light generated by the phosphor particles as well as parasitic absorption by the LED chip, metal contacts and housing; broad phosphor emission in the red wavelength range resulting in unused photons emitted into the near-IR; and poor down-conversion efficiency of the phosphors themselves when excited in the blue wavelength range (this is a combination of absorption and emission efficiency). While efficiencies improve with UV excitation, additional loss due to larger Stokes-shifted emission and lower efficiencies of LEDs in the UV versus the blue wavelength range makes this a less appealing solution overall.

As a result, poor efficiency drives a high effective ownership cost. The cost is also significantly impacted from the laborious manufacturing and assembly process to construct such devices, for example the heterogeneous integration of the phosphor-layer onto the LED-chip during packaging (DOE and Optoelectronics Industry Development Association "Light emitting diodes (LEDs) for general illumination," Technology Roadmap (2002)). Historically, blue LEDs have been used in conjunction with various band edge filters and phosphors to generate white light. However, many of the current filters allow photon emission from the blue end of the spectrum, thus limiting the quality of the white LED. The performance of the devices also suffer from poor color rendering due to a limited number of available phosphor colors and color combinations that can be simultaneously excited in the blue. There is a need therefore for efficient nanocomposite filters that can be tailored to filter out specific photon emissions in the visible (especially the blue end), ultraviolet and near infrared spectra.

While some development of organic phosphors has been made for SSWL, organic materials have several insurmountable drawbacks that make them unlikely to be a viable solution for high-efficiency SSWL. These include: rapid photo-degradation leading to poor lifetime, especially in the presence of blue and near-UV light; low absorption efficiency; optical scattering, poor refractive index matching at the chip-interface, narrow and non-overlapping absorption spectra for different color phosphors making it difficult or impossible to simultaneously excite multiple colors; and broad emission spectra. There exists a need therefore for polymeric layers that aid production of high quality, high intensity, white light. Surprisingly, the present invention meets this and other needs.

BRIEF SUMMARY OF THE INVENTION

In some embodiments, the present invention provides a quantum dot binding-ligand having a structure according to Formula I:

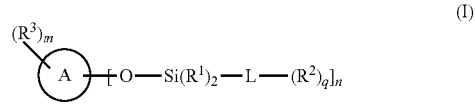

wherein radical A of formula I can be a polyhedral oligomeric silsesquioxane (POSS) moiety having 6 to 12 silicon atoms. Each group $-O-Si(R^1)_2-L-(R^2)_q$ of formula I can be bound to a silicon atom in the POSS moiety. Each $R^1$ of formula I can independently be H or $C_{1-6}$ alkyl. Each L of formula I can independently be $C_{3-8}$ alkylene, $C_{3-8}$ heteroalkylene, or $C_{3-8}$ alkylene-$(C(O)NH-C_{2-8}$ alkylene$)_q$. Each $R^2$ of formula I can independently be $C(O)OH$ or $NR^{2a}R^{2b}$, wherein $R^{2a}$ and $R^{2b}$ can each independently be H or $C_{1-6}$ alkyl. Each $R^3$ of formula I can independently be $C_{8-20}$ alkyl, $C_{8-20}$ heteroalkyl, $C_{8-20}$ alkenyl, $C_{8-20}$ alkynyl, cycloalkyl, or aryl. The subscript m of formula I can be an integer from 1 to 20. The subscript n of formula I can be an integer from 1 to 20. And each subscript q of formula I can independently be an integer from 1 to 10.

In some embodiments, the present invention provides a composition of a quantum dot binding-ligand of the present invention, and a first population of light emitting quantum dots (QDs).

BRIEF DESCRIPTION OF THE DRAWINGS

FIG. 1 shows a synthetic procedure for making the quantum-dot binding ligands of the present invention.

DETAILED DESCRIPTION OF THE INVENTION

I. General

The present invention provides polyhedral oligomeric silsesquioxane (POSS) moieties for binding to quantum dots. The ligands provide greater stability for the quantum dots due to a plurality of amine or carboxy binding groups.

II. Definitions

"Polyhedral oligomeric silsesquioxane" or "POSS" or "silsesquioxane" refers a compound having —Si—O—Si— bonds represented by the general formula $RSiO_{1.5}$ where R can be any suitable group. Silsesquioxanes can have a cage like structure such as a cube, cylinder, or prism. The silsesquioxanes can be complete cages or partial cages.

"Solubilizing group" refers to a substantially non-polar group that has a low solubility in water and high solubility in organic solvents such as hexane, pentane, toluene, benzene, diethylether, acetone, ethyl acetate, dichloromethane (methylene chloride), chloroform, dimethylformamide, and N-methylpyrrolidinone. Representative solubilizing groups include long-chain alkyl, long-chain heteroalkyl, long-chain alkenyl, long-chain alkynyl, cycloalkyl and aryl.

"Amine binding group" refers to an amine having the formula —$NR_2$. The R groups attached to the nitrogen atom can be any suitable group, including hydrogen and alkyl. Moreover, the R groups can be the same or different.

"Carboxy binding group" refers to a carboxylic acid group: C(O)OH.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{1-12}$, $C_{1-14}$, $C_{1-16}$, $C_{1-18}$, $C_{1-20}$, $C_{8-20}$, $C_{12-20}$, $C_{14-20}$, $C_{16-20}$, and $C_{18-20}$. For example, $C_{1-6}$ alkyl includes, but is not limited to, methyl, ethyl, propyl, isopropyl, butyl, isobutyl, sec.butyl, tert-butyl, pentyl, isopentyl, hexyl, etc. Other alkyl groups include octane, nonane, decane, undecane, dodecane, tridecane, tetradecane, pentadecane, hexadecane, heptadecane, octadecane, nonadecane, and icosane. Alkyl groups can be substituted or unsubstituted.

"Long-chain alkyl groups" are alkyl groups, as defined above, having at least 8 carbon chain atoms. Long-chain alkyl groups can include any number of carbons, such as $C_{8-20}$, $C_{12-20}$, $C_{14-20}$, $C_{16-20}$, or $C_{18-20}$. Representative groups include, but are not limited to, octane, nonane, decane, undecane, dodecane, tridecane, tetradecane, pentadecane, hexadecane, heptadecane, octadecane, nonadecane, and icosane. Long-chain alkyl groups can also be substituted with silane groups.

"Alkylene" refers to a straight or branched, saturated, aliphatic radical having the number of carbon atoms indicated, and linking at least two other groups. The alkylene can link to 2, 3, 4, or more groups, and be divalent, trivalent, tetravalent, or multi-valent. The groups linked to the alkylene can be linked to the same atom or different atoms of the alkylene group. For instance, a straight chain alkylene can be the bivalent radical of —$(CH_2)_n$—, where n is 1, 2, 3, 4, 5 or 6. Representative alkylene groups include, but are not limited to, methylene, ethylene, propylene, isopropylene, butylene, isobutylene, sec-butylene, pentylene and hexylene. Alkylene groups can be substituted or unsubstituted.

"Alkylamine binding group" refers to an amine linked to an alkyl, as described above, and generally having the formula —$C_{1-20}$ alkyl-$NR_2$. Any suitable alkyl chain is useful. The R groups attached to the nitrogen atom can be any suitable group, including hydrogen and alkyl. Moreover, the R groups can be the same or different.

"Heteroalkyl" refers to an alkyl group of any suitable length and having from 1 to 5 heteroatoms such as N, O and S. Additional heteroatoms can also be useful, including, but not limited to, B, Al, Si and P. The heteroatoms can also be oxidized, such as, but not limited to, —S(O)— and —$S(O)_2$—. For example, heteroalkyl can include ethers (ethyleneoxy and poly(ethyleneoxy)), thioethers and alkylamines. The heteroatom portion of the heteroalkyl can replace a hydrogen of the alkyl group to form a hydroxy, thio or amino group. Alternatively, the heteroatom portion can be the connecting atom, or be inserted between two carbon atoms.

"Long-chain heteroalkyl groups" are heteroalkyl groups, as defined above, having at least 8 chain atoms. Long-chain heteroalkyl groups can include any number of chain atoms, such as $C_{8-20}$, $C_{12-20}$, $C_{14-20}$, $C_{16-20}$, or $C_{18-20}$.

"Heteroalkylene" refers to a heteroalkyl group, as defined above, linking at least two other groups. The two or more moieties linked to the heteroalkylene can be linked to the same atom or different atoms of the heteroalkylene.

"Alkenyl" refers to a straight chain or branched hydrocarbon having at least 2 carbon atoms and at least one double bond. Alkenyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Alkenyl groups can have any suitable number of double bonds, including, but not limited to, 1, 2, 3, 4, 5 or more. Examples of alkenyl groups include, but are not limited to, vinyl (ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can be substituted or unsubstituted.

"Long-chain alkenyl groups" are alkenyl groups, as defined above, having at least 8 carbon chain atoms. Long-chain alkenyl groups can include any number of carbons, such as $C_{8-20}$, $C_{12-20}$, $C_{14-20}$, $C_{16-20}$, or $C_{18-20}$. Representative groups include, but are not limited to, octene, nonene, decene, undecene, dodecene, tridecene, tetradecene, pentadecene, hexadecene, heptadecene, octadecene, nonadecene, and icosene. The long-chain alkenyl groups can have one or more alkene groups.

"Alkynyl" refers to either a straight chain or branched hydrocarbon having at least 2 carbon atoms and at least one triple bond. Alkynyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5- hexadiynyl, 2,4-hexadiynyl, or 1,3,5-hexatriynyl. Alkynyl groups can be substituted or unsubstituted.

"Long-chain alkynyl groups" are alkynyl groups, as defined above, having at least 8 carbon chain atoms. Long-chain alkynyl groups can include any number of carbons, such as $C_{8-20}$, $C_{12-20}$, $C_{14-20}$, $C_{16-20}$, or $C_{18-20}$. Representative groups include, but are not limited to, octyne, nonyne, decyne, undecyne, dodecyne, tridecyne, tetradecyne, pentadecyne, hexadecyne, heptadecyne, octadecyne, nonadecyne, and icosyne. The long-chain alkynyl groups can have one or more alkyne groups.

"Cycloalkyl" refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, $C_{3-12}$, $C_{6-10}$, or $C_{6-12}$. Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2] bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted.

"Alkyl-cycloalkyl" refers to a radical having an alkyl component and a cycloalkyl component, where the alkyl component links the cycloalkyl component to the point of attachment. The alkyl component is as defined above, except that the alkyl component is at least divalent, an alkylene, to link to the cycloalkyl component and to the point of attachment. In some instances, the alkyl component can be absent. The alkyl component can include any number of carbons, such as $C_{1-6}$, $C_{1-2}$, $C_{1-3}$, $C_{1-4}$, $C_{1-5}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. The cycloalkyl component is as defined within. Exemplary alkyl-cycloalkyl groups include, but are not limited to, methyl-cyclopropyl, methyl-cyclobutyl, methyl-cyclopentyl and methyl-cyclohexyl.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Alkyl-aryl" refers to a radical having an alkyl component and an aryl component, where the alkyl component links the aryl component to the point of attachment. The alkyl component is as defined above, except that the alkyl component is at least divalent, an alkylene, to link to the aryl component and to the point of attachment. The alkyl component can include any number of carbons, such as $C_{0-6}$, $C_{1-2}$, $C_{1-3}$, $C_{1-4}$, $C_{1-5}$, $C_{1-6}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. In some instances, the alkyl component can be absent. The aryl component is as defined above. Examples of alkyl-aryl groups include, but are not limited to, benzyl and ethylbenzene. Alkyl-aryl groups can be substituted or unsubstituted.

"Silane" or "silyl" refers to a silicon atom having several substituents, and generally having the formula —$SiR_3$. The R groups attached to the silicon atom can be any suitable group, including, but not limited to, hydrogen, halogen and alkyl. Moreover, the R groups can be the same or different.

"Forming a reaction mixture" refers to combining at least two components in a container under conditions suitable for the components to react with one another and form a third component.

"Catalyst" refers to a transition metal catalyst capable of performing a hydrosilylation reaction. Representative catalysts include palladium and platinum catalysts such as Karstedt's catalyst. Other catalysts are useful in the present invention.

"Cation" refers to metal and non-metal ions having at least a 1+ charge. Metals useful as the metal cation in the present invention include the alkali metals, alkali earth metals, transition metals and post-transition metals. Alkali metals include Li, Na, K, Rb and Cs. Non-metal cations can be formed from a variety of groups including quaternary nitrogen groups such as ammonium ions, $R_4N^+$, wherein the R groups can be the same or different, and can be any suitable group, including, but not limited to, hydrogen, alkyl, alkenyl, alkynyl, cycloalkyl, heterocycloalkyl, aryl and heteroaryl.

"Quantum dot" or "nanocrystal" refers to nanostructures that are substantially monocrystalline. A nanocrystal has at least one region or characteristic dimension with a dimension of less than about 500 nm, and down to on the order of less than about 1 nm. As used herein, when referring to any numerical value, "about" means a value of ±10% of the stated value (e.g. about 100 nm encompasses a range of sizes from 90 nm to 110 nm, inclusive). The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

III. Quantum Dot-Binding Ligand

The present invention provides POSS ligands for binding to quantum dots (QDs) and related materials. The quantum-dot binding ligands of the present invention contain a silsesquioxane portion and a plurality of amine or carboxy groups capable of binding to QDs, improving stability of the resulting ligand-QD complex.

In some embodiments, the present invention provides a quantum dot binding-ligand having a structure according to Formula I:

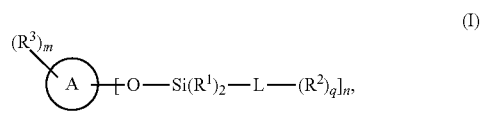

wherein radical A of formula I can be a polyhedral oligomeric silsesquioxane (POSS) moiety having 6 to 12 silicon atoms.

Each group —O—Si($R^1$)$_2$-L-($R^2$)$_q$ of formula I can be bound to a silicon atom in the POSS moiety. Each $R^1$ of formula I can independently be H or $C_{1-6}$ alkyl. Each L of formula I can independently be $C_{3-8}$ alkylene, $C_{3-8}$ heteroalkylene, or $C_{3-8}$ alkylene-(C(O)NH—$C_{2-8}$ alkylene)$_q$. Each $R^2$ of formula I can independently be C(O)OH or $NR^{2a}R^{2b}$, wherein $R^{2a}$ and $R^{2b}$ can each independently be H or $C_{1-6}$ alkyl. Each $R^3$ of formula I can independently be $C_{8-20}$ alkyl, $C_{8-20}$ heteroalkyl, $C_{8-20}$ alkenyl, $C_{8-20}$ alkynyl, cycloalkyl, or aryl. The subscript m of formula I can be an integer from 1 to 20. The subscript n of formula I can be an integer from 1 to 20. And each subscript q of formula I can independently be an integer from 1 to 10.

The siloxane portion of formula I can be substituted with any suitable group. For example, $R^1$ can be hydrogen, alkyl, heteroalkyl, alkenyl, alkynyl, cycloalkyl or aryl. In some embodiments, each $R^1$ can independently be $C_{1-6}$ alkyl. In other embodiments, each $R^1$ can independently be $C_{1-3}$ alkyl. In some other embodiments, each $R^1$ can be methyl.

The binding ligands can be any suitable binding ligands. For example, the binding ligands can be amine or carboxy binding groups. Radical L can be any suitable linker to link the binding group $R^2$ to the siloxane moiety. In some embodiments, each L can independently be $C_{3-8}$ alkylene, $C_{3-8}$ alkylene-O—$C_{2-8}$ alkylene, $C_{3-8}$ alkylene-(C(O)NH—$C_{2-8}$ alkylene)$_2$, or $C_{3-8}$ alkylene-O—$C_{1-8}$ alkylene-(C(O)NH—$C_{2-8}$ alkylene)$_3$. In other embodiments, each L can independently be propylene, butylene, pentylene, n-propylene-O-i-propylene, and pentylene-(C(O)NH-ethylene)$_2$.

The binding group, $R^2$, can be any suitable amine or carboxylic acid. For example, $R^2$ can be a primary amine where both of $R^{2a}$ and $R^{2b}$ are H. Alternatively, $R^2$ can be a secondary amine where one of $R^{2a}$ and $R^{2b}$ is H and the other is $C_{1-6}$ alkyl. Representative secondary amines include, but are not limited to, those where $R^{2a}$ is methyl, ethyl, propyl, isopropyl, butyl, etc. Tertiary amines, where each of $R^{2a}$ and $R^{2b}$ is $C_{1-6}$ alkyl, are also useful as the binding group $R^2$. In those cases, the $R^{2a}$ and $R^{2b}$ can be the same or different. Representative tertiary amines include, but are not limited to —N(Me)$_2$, —N(Et)$_2$, —N(Pr)$_2$, —N(Me)(Et), —N(Me)(Pr), —N(Et)(Pr), among others.

In some embodiments, each -L-($R^2$)$_q$ group can independently be $C_{3-8}$ alkylene-($R^2$)$_{1-3}$, $C_{3-8}$ heteroalkylene-$R^2$, or $C_{3-8}$ alkylene-(C(O)NH—$C_{2-8}$ alkylene-$R^2$)$_2$. In other embodiments, each L-($R^2$)$_q$ group can independently be $C_{3-8}$ alkylene-C(O)OH, $C_{3-8}$ alkylene-(C(O)OH)$_2$, $C_{3-8}$ alkylene-O—$C_{2-8}$ alkylene-(C(O)OH)$_3$, $C_{3-8}$ alkylene-$NR^{2a}R^{2b}$, or $C_{3-8}$ alkylene-(C(O)NH—$C_{2-8}$ alkylene-$NR^{2a}R^{2b}$)$^2$. In some other embodiments, each L-($R^2$)$_q$ group can independently be:

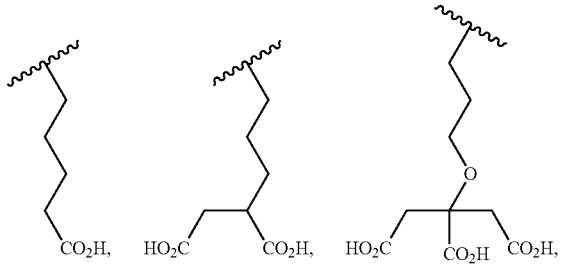

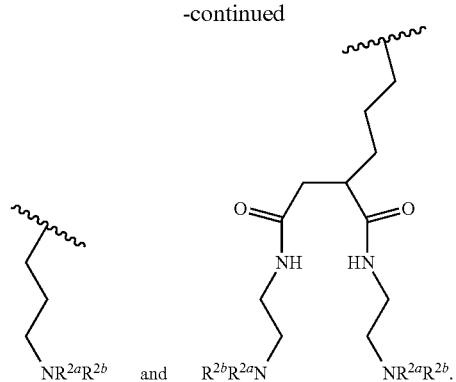

In some embodiments, each $R^2$ can be C(O)OH. In other embodiments, each L can be $C_{3-8}$ alkylene. In some other embodiments, each L-($R^2$)$_q$ group can independently be:

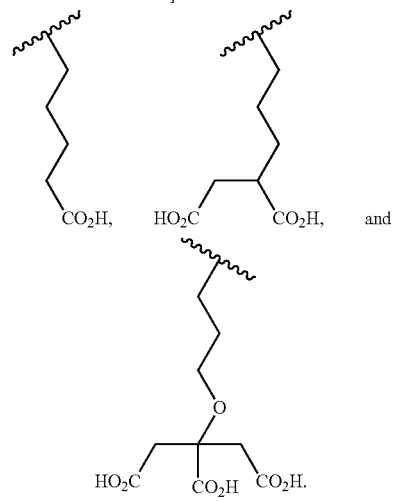

In some other embodiments, each L-($R^2$)$_q$ group can independently be:

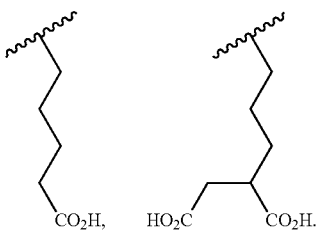 [SMILES: *CCCCC(=O)O ; *CCCC(CC(=O)O)C(=O)O]

In some other embodiments, each L-($R^2$)$_q$ group can independently be:

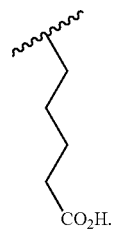

In some embodiments, each $R^2$ can be $NH_2$. In other embodiments, each L can independently be $C_{3-8}$ alkylene-(C (O)NH—C$_{2-8}$ alkylene)$_q$, and each subscript q can be 2. In some other embodiments, each L-(R$^2$)$_q$ group can independently be:

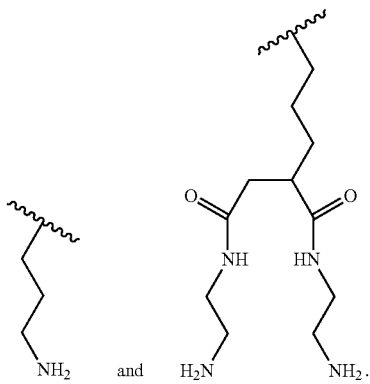 [SMILES: *CCCN ; *CCCC(CC(=O)NCCN)C(=O)NCCN]

and

In some other embodiments, each L-(R$^2$)$_q$ group can independently be:

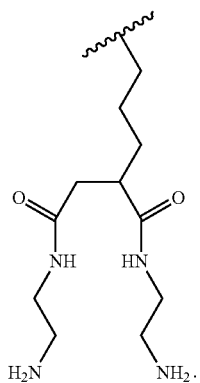 [SMILES: *CCCC(CC(=O)NCCN)C(=O)NCCN]

In some other embodiments, each L-(R$^2$)$_q$ group can independently be:

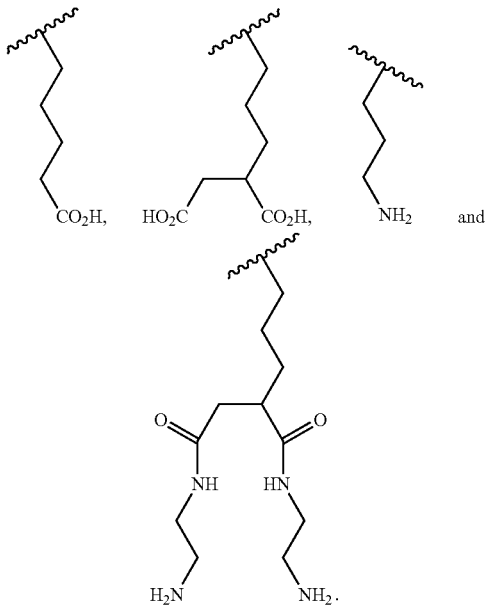

Any suitable POSS moiety is useful in the quantum-dot binding ligands of the present invention. Representative POSS moieties can be found in *Journal of Scientific and Industrial Research* 2009, 68, 437-464, and *Applied Organometallic Chemistry* 1999, 13, 311-327 (incorporated herein by reference in their entirety). The POSS moieties can adopt any suitable shape, such as a cage, ladder, prism, or can be random. The caged POSS moieties can be completely or incompletely condensed silsesquioxanes and can have any suitable number of silicon atoms, such as T$_6$, T$_7$, T$_8$, T$_{10}$, T$_{12}$, or others.

The POSS moieties can be prepared by any method known to one of skill in the art. For example, a substituted silyl, RSiCl$_3$, can be hydrolyzed to form RSi(OH)$_3$, followed by condensation to form the completely condensed cage with the formula RSiO$_{1.5}$. Alternatively, the condensation is not driven to completion. In those instances, the POSS moiety can have an open corner with silanol groups (Si—OH) available for further functionalization. In some embodiments, the POSS moiety can have the following structure:

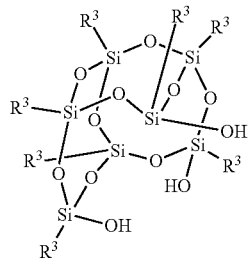

a T$_7$ silsesquioxane due to the seven silicon atoms, affording an open corner and three available silanols due to incomplete condensation. Several POSS moieties are available commercially, including from Hybrid Plastics of Hattiesburg, Miss.

The POSS moieties can be substituted with any suitable substituent. For example, the POSS moieties can be substituted with hydrogen, alkyl, heteroalkyl, alkenyl, alkynyl, cycloalkyl or aryl. The substituents can be any suitable size. In some embodiments, the POSS substituents act as solubilizing groups. In other embodiments, each R$^3$ can independently be C$_{8-20}$ alkyl, C$_{8-20}$ heteroalkyl, C$_{8-20}$ alkenyl, C$_{8-20}$ alkynyl, cycloalkyl, or aryl. In some other embodiments, each R$^3$ can independently be C$_{8-20}$ alkyl, cycloalkyl, or aryl. In still other embodiments, each R$^3$ can independently be octyl, isooctyl, nonyl, decyl, undecyl, dodecyl, tridecyl, tetradecyl, pentadecyl, hexadecyl, heptadecyl, octadecyl, nonadecyl, icosyl, cyclopentyl, cyclohexyl, cyclooctyl, norbornyl, adamantyl, phenyl, naphthyl, or anthracenyl. In yet other embodiments, each R$^3$ can independently be cyclohexyl, phenyl, and isooctyl. In still yet other embodiments, each R$^3$ can be cyclohexyl.

The POSS moiety can have any suitable number of substituents. For example, each silicon atom can have one substituent, such that there can be 4, 5, 6, 7, 8, 9, 10, 11, 12, or more substituents. In some embodiments, the subscript m can be an integer from 5 to 10. In other embodiments, the subscript m can be 7.

When the POSS moiety is not completely condensed and is missing a corner, additional substituents can link to the free silanols (Si—OH) available. All available silanol groups can be functionalized, or only a partial number of the available silanols can be functionalized. In some embodiments, the subscript n can be an integer from 1 to 6. In other embodiments, the subscript n can be 3. In some other embodiments, the POSS moiety of formula I can have the following structure:

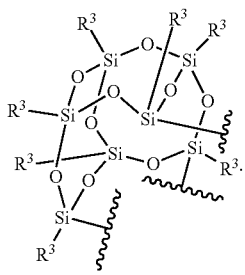

In some embodiments, the quantum-dot binding ligand can have the POSS moiety shown above, wherein each $R^1$ of formula I can be methyl, each -L-$(R^2)_q$ group of formula I can be:

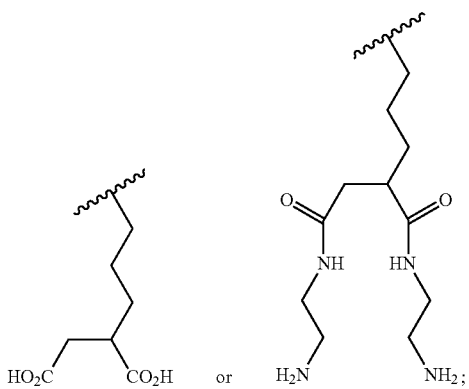 [SMILES: *CCCC(CC(=O)O)C(=O)O ; *CCCC(CC(=O)NCCN)C(=O)NCCN]

each $R^3$ of formula I can be cyclohexyl, phenyl, or isooctyl, the subscript m of formula I can be 7, and the subscript n of formula I can be 3.

The quantum-dot binding ligands of the present invention can be prepared by methods known to one of skill in the art. As shown in FIG. 1, the silanols of an incompletely condensed POSS moiety, a $T_7$ substituted with cyclohexanes in this case, is condensed with dimethylchlorosilane to prepare the silane modified POSS moiety. The available Si—H bonds are then hydrosilylated with a binding ligand precursor that is then converted to the binding ligand via known methods.

IV. Quantum Dot Compositions

The quantum dot binding-ligands of the present invention can be complexed to a quantum dot (QD). In some embodiments, the present invention provides a composition of a quantum dot binding-ligand of the present invention, and a first population of light emitting quantum dots (QDs).

Quantum Dots

Typically, the region of characteristic dimension will be along the smallest axis of the structure. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photoemission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. Nos. 6,225,198, 6,207,229, 6,322,901, 6,872,249, 6,949,206, 7,572,393, 7,267,865, 7,374,807, US Patent Publication No. 2008/0118755, filed Dec. 9, 2005, and U.S. Pat. No. 6,861,155, each of which is incorporated by reference herein in its entirety.

The QDs (or other nanostructures) for use in the present invention can be produced from any suitable material, suitably an inorganic material, and more suitably an inorganic conductive or semiconductive material. Suitable semiconductor materials include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, (Al, Ga, In)$_2$(S, Se, Te)$_3$, $Al_2CO_3$, and appropriate combinations of two or more such semiconductors.

In some embodiments, the semiconductor nanocrystals or other nanostructures can also include a dopant, such as a p-type dopant or an n-type dopant. The nanocrystals (or other nanostructures) useful in the present invention can also include II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The bandedge emission from luminescent nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In some embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/CdS, CdTe/CdS or CdTe/ZnS. Most preferably, the quantum dots of the present invention can include core-shell QDs having a core including CdSe and at least one encapsulating shell layer including CdS or ZnS. In other embodiments, InP is used as the nanocrystal material.

In some embodiments, the light emitting quantum dots can be CdSe or CdTe and quantum-dot binding ligand can include an amine binding group. In other embodiments, the light emitting quantum dots can be CdSe or CdTe and $R^2$ can be $NR^{2a}R^{2b}$. In some other embodiments, the light emitting quantum dots can be InP and quantum-dot binding ligand can include a carboxy binding group. In still other embodiments, the light emitting quantum dots can be InP and $R^2$ can be C(O)OH.

The luminescent nanocrystals can be made from a material impervious to oxygen, thereby simplifying oxygen barrier requirements and photostabilization of the QDs in the QD phosphor material. In some embodiments, the luminescent nanocrystals can be coated with one or more quantum dot binding-ligand of the present invention and dispersed in an organic polymeric matrix having one or more matrix materials, as discussed in more detail below. The luminescent nanocrystals can be further coated with one or more inorganic layers having one or more material such as a silicon oxide, an aluminum oxide, or a titanium oxide (e.g., $SiO_2$, $Si_2O_3$, $TiO_2$, or $Al_2O_3$), to hermetically seal the QDs.

Matrix Materials

Generally, the polymeric ligand is bound to a surface of the nanostructure. Not all of the ligand material in the composition need be bound to the nanostructure, however. The polymeric ligand can be provided in excess, such that some molecules of the ligand are bound to a surface of the nanostructure and other molecules of the ligand are not bound to the surface of the nanostructure.

The phosphor material of the present invention further comprises a matrix material in which the QDs are embedded or otherwise disposed. The matrix material can be any suitable host matrix material capable of housing the QDs. Suitable matrix materials will be chemically and optically compatible with back-lighting unit (BLU) components, including the QDs and any surrounding packaging materials or layers. Suitable matrix materials include non-yellowing optical materials which are transparent to both the primary and secondary light, thereby allowing for both primary and secondary light to transmit through the matrix material. In preferred embodiments, the matrix material completely surrounds the QDs and provides a protective barrier which prevents deterioration of the QDs caused by environmental conditions such as oxygen, moisture, and temperature. The matrix material can be flexible in applications where a flexible or moldable QD film is desired. Alternatively, the matrix material can include a high-strength, non-flexible material.

Preferred matrix materials will have low oxygen and moisture permeability, exhibit high photo- and chemical-stability, exhibit favorable refractive indices, and adhere to the barrier or other layers adjacent the QD phosphor material, thus providing an air-tight seal to protect the QDs. Preferred matrix materials will be curable with UV or thermal curing methods to facilitate roll-to-roll processing. Thermal curing is most preferred.

Suitable matrix materials for use in QD phosphor material of the present invention include polymers and organic and inorganic oxides. Suitable polymers for use in the matrixes of the present invention include any polymer known to the ordinarily skilled artisan that can be used for such a purpose. In suitable embodiments, the polymer will be substantially translucent or substantially transparent. Suitable matrix materials include, but are not limited to, epoxies, acrylates, norbornene, polyethylene, poly(vinyl butyral):poly(vinyl acetate), polyurea, polyurethanes; silicones and silicone derivatives including, but not limited to, amino silicone (AMS), polyphenylmethylsiloxane, polyphenylalkylsiloxane, polydiphenylsiloxane, polydialkylsiloxane, silsesquioxanes, fluorinated silicones, and vinyl and hydride substituted silicones; acrylic polymers and copolymers formed from monomers including, but not limited to, methylmethacrylate, butylmethacrylate, and laurylmethacrylate; styrene-based polymers such as polystyrene, amino polystyrene (APS), and poly(acrylonitrile ethylene styrene) (AES); polymers that are crosslinked with bifunctional monomers, such as divinylbenzene; cross-linkers suitable for cross-linking ligand materials, epoxides which combine with ligand amines (e.g., APS or PEI ligand amines) to form epoxy, and the like.

The QDs used the present invention can be embedded in a polymeric matrix (or other matrix material) using any suitable method, for example, mixing the nanocrystals in a polymer and casting a film, mixing the nanocrystals with monomers and polymerizing them together, mixing the nanocrystals in a sol-gel to form an oxide, or any other method known to those skilled in the art. As used herein, the term "embedded" is used to indicate that the luminescent nanocrystals are enclosed or encased within the polymer that makes up the majority component of the matrix. It should be noted that luminescent nanocrystals are suitably uniformly distributed throughout the matrix, though in further embodiments they can be distributed according to an application-specific uniformity distribution function.

The composition optionally includes a plurality or population of the nanostructures, e.g., with bound ligand. The composition optionally includes a solvent, in which the nanostructure(s) and ligand can be dispersed. As noted, the nanostructures and ligand can be incorporated into a matrix to form a polymer layer or nanocomposite (e.g., a silicone matrix formed from the ligand). Thus, the composition can also include a crosslinker and/or an initiator. Suitable crosslinkers include organic or polymeric compounds with two or more functional groups (e.g., two, three, or four) that can react with amine groups (or other groups on the ligand) to form covalent bonds. Such functional groups include, but are not limited to, isocyanate, epoxide (also called epoxy), succinic anhydride or other anhydride or acid anhydride, and methyl ester groups, e.g., on a silicone, hydrocarbon, or other molecule. In one class of embodiments, the crosslinker is an epoxy crosslinker, e.g., an epoxycyclohexyl or epoxypropyl crosslinker (e.g., compounds A-C or D-G in Table 1, respectively). The reactive groups on the crosslinker can be pendant and/or terminal (e.g., compounds B and D or compounds A, C, and E-G in Table 1, respectively). The crosslinker is optionally an epoxy silicone crosslinker, which can be, e.g., linear or branched. In certain embodiments, the crosslinker is a linear epoxycyclohexyl silicone or a linear epoxypropyl (glycidyl) silicone. A number of exemplary crosslinkers are listed in Table 1. Suitable crosslinkers are commercially available. For example, compounds H-K are available from Aldrich and compounds A-G are available from Gelest, Inc., e.g., with a formula weight of about 900-1100 for compound A as product no. DMS-EC13, with a formula weight of about 18,000 and a molar percentage of 3-4% for m for compound B as product no. ECMS-327, with a formula weight of about 8000, m≈6, and n≈100 for compound D as product no. EMS-622, and as product no. DMS-E09 for compound E.

TABLE 1

Exemplary crosslinkers.

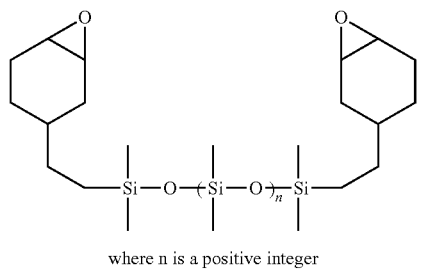

where n is a positive integer

A

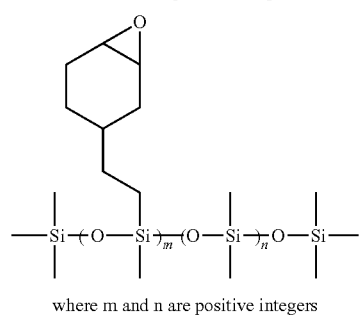

where m and n are positive integers

B

TABLE 1-continued
Exemplary crosslinkers.
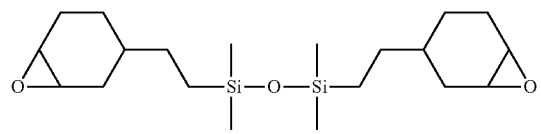 [SMILES: C[Si](C)(CCC1CCC2OC2C1)O[Si](C)(C)CCC1CCC2OC2C1]
C
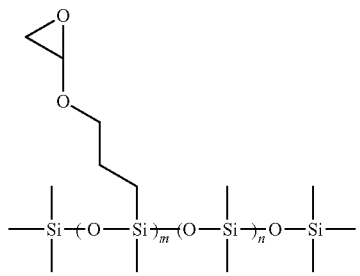
where m and n are positive integers (e.g. m ≈ 6 and n ≈ 100)
D
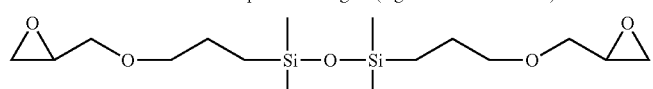
E
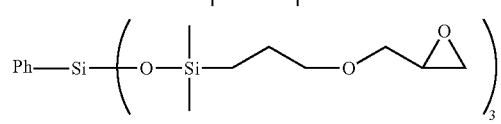
where Ph represents a phenyl group
F
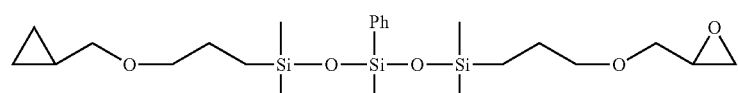
where Ph represents a phenyl group
G
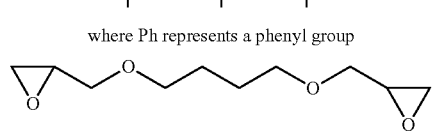
1,4-butanediol diglycidyl ether
H
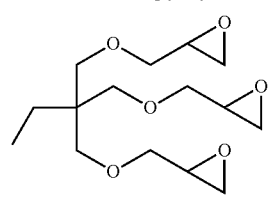
trimethylolpropane triglycidyl ether
I
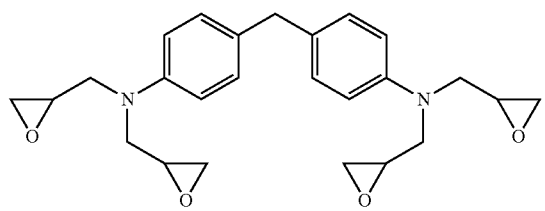
4,4'-methylenebis(N,N-diglycidylaniline)
J
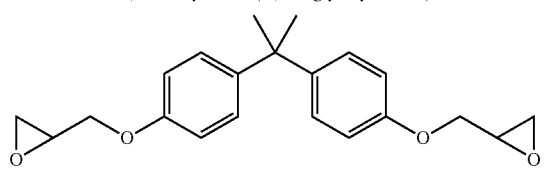
bisphenol A diglycidyl ether
K TABLE 1-continued Exemplary crosslinkers.

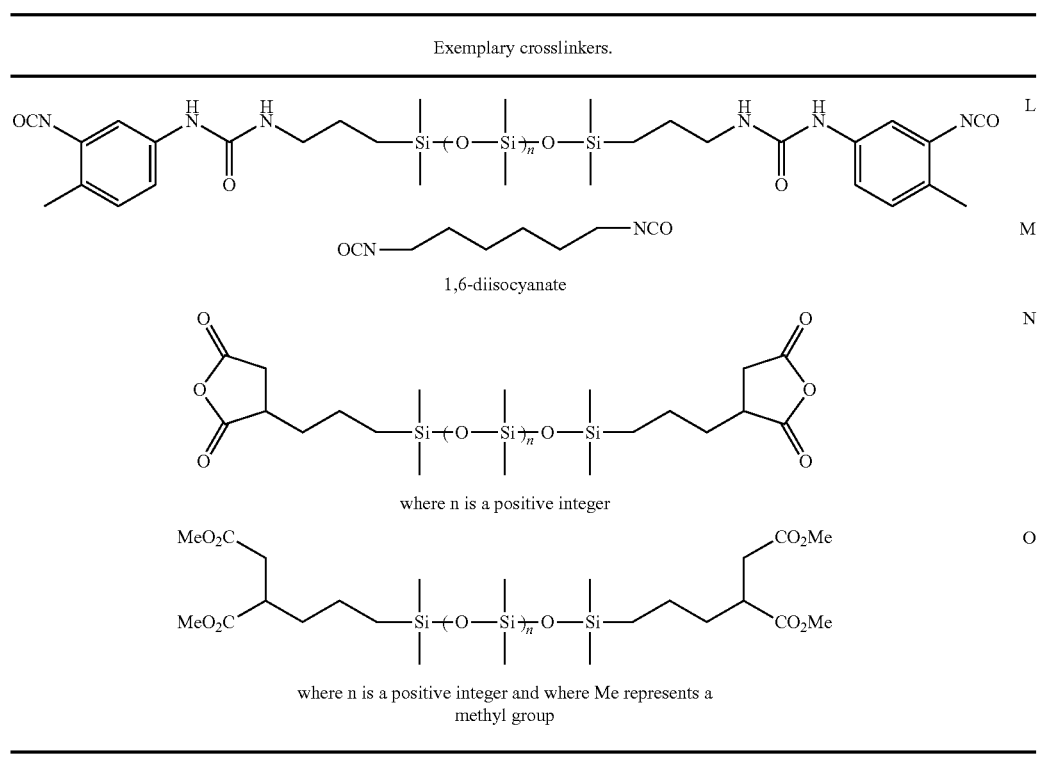

The quantum dot compositions and films prepared using the quantum dot binding-ligands of the present invention are useful in a variety of light emitting devices, quantum dot lighting devices and quantum dot-based backlighting units. Representative devices are well known to those of skill in the art and can be found, for example, in US Publication Nos. 2010/0167011 and 2012/0113672, and U.S. Pat. Nos. 7,750,235 and 8,053,972.

The quantum dot compositions of the present invention can be used to form a lighting device such as a backlighting unit (BLU). A typical BLU can include a QD film sandwiched between two barrier layers. QD films of the present invention can include a single quantum dot and a single quantum-dot binding-ligand, or a plurality of quantum dots and a plurality of quantum-dot binding-ligands. For example, a QD film of the present invention can include a cadmium quantum dot, such as CdS, CdTe, CdSe, CdSe/CdS, CdTe/CdS, CdTe/ZnS, CdSe/CdS/ZnS, CdSe/ZnS, CdSeZn/CdS/ZnS, or CdSeZn/ZnS, and a quantum-dot binding ligand having amine binding groups. The QD films of the present invention can include an InP quantum dot, such as InP or InP/ZnS, and a quantum-dot binding ligand having carboxy binding groups.

In some embodiments, the QD films of the present invention include both cadmium and indium containing quantum dots. When both cadmium and indium containing quantum dots are present, the QD film can include a first film containing the cadmium quantum dots and a second film containing the indium quantum dots. These films can then be stacked one on top of another to form a layered film. In some embodiments, a barrier film or other type of film can be stacked in between each of the cadmium and indium films. In other embodiments, the cadmium and indium quantum dots are mixed together in a single QD film with their respective quantum-dot binding-ligands.

Mixed QD films, with either a single layer or multi-layer film, have the advantage of reducing the amount of cadmium in the system. For example, the cadmium can be reduced below 300 ppm, 200, 100, 75, 50 or 25 ppm. In some embodiments, the QD film contains less than about 100 ppm cadmium. In other embodiments, the QD film contains less than about 50 ppm.

V. EXAMPLES

Example 1

Preparation of Cyclohexyl-Hexamine Quantum-Dot Binding Ligand

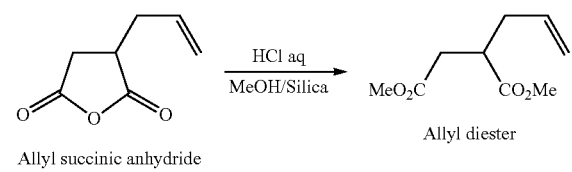

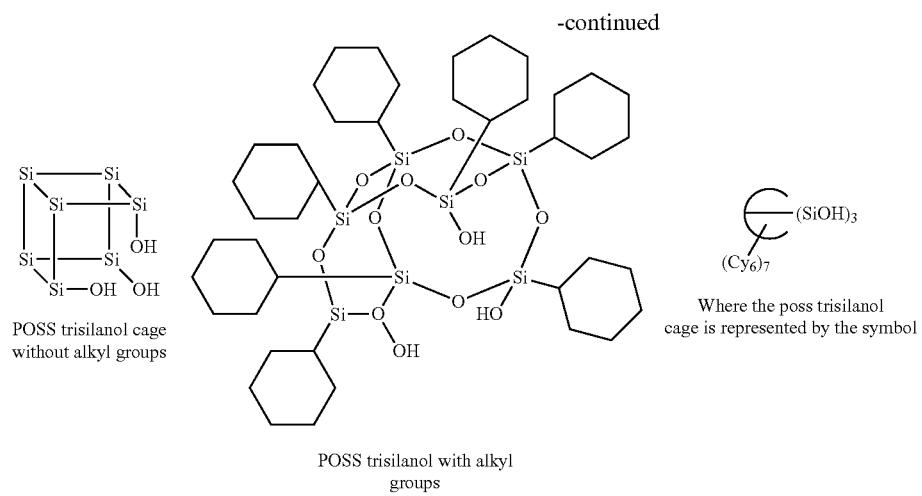

POSS trisilanol cage without alkyl groups

POSS trisilanol with alkyl groups

Where the poss trisilanol cage is represented by the symbol

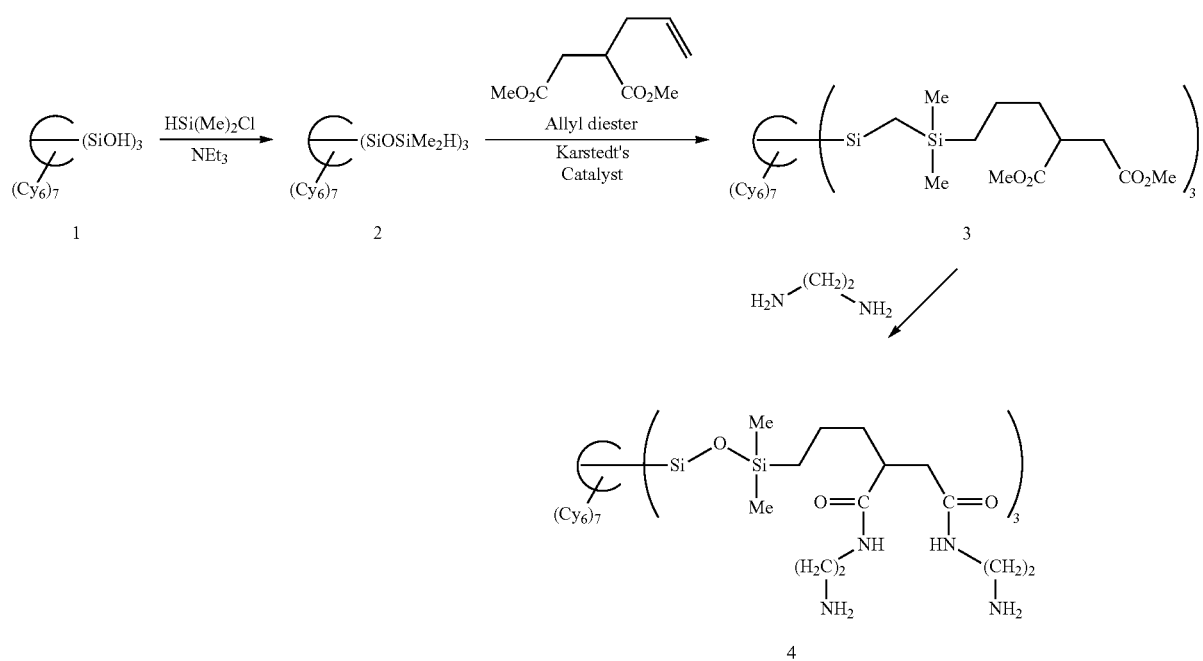

General Methods. All manipulations were performed under a dry, oxygen-free, nitrogen atmosphere using standard Schlenk technique. Dichlorosilane, triethylamine and 1,2-diaminoethane (DME) were purchased from Aldrich. The amine was distilled before use. Heptacyclohexyl POSS trisilanol 1 was purchased from Hybrid Plastics. Allyl succinic anhydride was purchased from TCI America. Toluene and hexanes were purchased dry and deoxygenated in 1 L containers from Aldrich. Hydrochloric acid was purchased from Air Products and ethyl acetate was purchased from Fisher Scientific. Karstedt's catalyst, 2.1 to 2.4 wt % in xylenes was obtained from Gelest and used without further purification. (The stock solution contains 0.113 moles of platinum per mL.) NMR chemical shift data were recorded with a Bruker FT NMR at 400 MHz for $^1$H or 100 MHz for $^{13}$C {$^1$H} and are listed in ppm. IR analysis was preformed on a Nicolet 7200 FTIR equipped with an attenuated total reflectance sampling accessory.

Synthesis of the Allyl Diester. To a 500 mL RBF on the Schlenk line was added methanol (247 mL, 195 g, 6.10 moles) and silica (20 g) which formed a slurry. Then allyl succinic anhydride (20 mL, 17.1 g, 122 moles) was added followed by conc HCl (20.3 mL, 244 mmoles). The flask was placed into an oil bath and refluxed at 70 C overnight. A sample was neutralized with excess sodium bicarbonate, extracted with ethyl acetate, dried with anhydrous sodium sulfate and the volatiles removed by vacuum transfer to prepare for analysis by FTIR and 1H NMR which determined that the anhydride had been converted to diester. The reaction solution was then slowly poured into a stirring solution of water (300 mL) containing sodium bicarbonate (30.7 g, 366 mmoles). After bubbling ceased ethyl acetate (125 mL) was added and the solution poured into a reparatory funnel. Upon phase separation the aqueous phase was extracted with ethyl acetate (2×125 mL) and the extracts combined. The extracts were washed with brine (2×125 mL), dried with anhydrous sodium sulfate, the volatiles removed by rotovap and the product distilled by kugelrohr at 100 C and a pressure of less than 250 mtorr to produce a clear colorless oil (22.7 g, 122 mmoles, quantitative yield).

Synthesis of Heptacyclohexyl POSS Trisilane (2). To a 100 mL, 3-neck RBF equipped with a nitrogen inlet adapter, thermocouple positioned to measure the reaction solution directly and short path distillation head with receiver was added heptacyclohexyl POSS trisilanol (1.0 g, 1.03 mmoles). Additionally the distillation head was attached to a bubbler containing a one-way valve. The apparatus was configured so that upon attachment of a Schlenk line to the hose adapter nitrogen gas could be passed into the reaction flask, across the surface of the reaction solution and out the bubbler attached to the distillation head. Also the one way valve on the bubbler allowed vacuum to be applied to the whole apparatus, from the bubbler to the hose adapter. The thermocouple was attached to a heating mantle with temperature controller to maintain the desired reaction solution temperature. The apparatus was placed under vacuum to a pressure of less than 50 mtorr before being back flushed with nitrogen. This vacuum step was preformed with the valve between the distillation head and bubbler open.

Toluene (50 mL) was added, the receiver was cooled in a dry ice/ethanol bath and the reaction flask was heated to 110 C while nitrogen was passed across the surface of the reaction solution from the inlet adapter and out through the distillation head and bubbler. The distillation was stopped after collection of about 25 mL of distillate. Then the distillation head was removed and replaced with a reflux condenser. Dimethyl chlorosilane (0.389 g, 0.456 mL, 4.11 mmoles) was added and after stirring for about 5 minutes was followed by triethylamine (0.416 g, 0.573 mL, 4.11 mmoles). This solidified the reaction solution so 25 mL of toluene to produce a freely flowing, opaque white, reaction solution. A sample was prepared for analysis by filtration followed by removal of volatiles. Analysis by FTIR and $^1$H NMR confirmed the reaction had gone to completion. The volatiles were removed from the reaction solution by vacuum transfer using a supplementary trap cooled with dry ice/ethanol. The resulting white paste was extracted with hexanes (1×20 mL, 2×5 mL) with the extracts transferred individually to a separate Schlenk flask using a filter tipped cannula equipped with Fisherbrand P8 filter paper (particle retention 20-25 um). The volatiles were removed from the clear colorless solution by vacuum transfer to leave a 2 as a white powder and was stored in the glove box.

Synthesis of Heptacyclohexyl POSS Hexaester (3). To a 50 mL Schlenk flask in the glove box was added hepta cyclohexyl POSS trisilane 2 (0.276 g, 0.240 mmoles) followed by toluene (5 mL) which formed a clear solution. Then allyl diester (0.143 g, 0.721 mmoles) was added and the reaction solution heated to 80 C before Karstedt's catalyst (0.638 mL of a 10,000× dilution or 7.21×10$^{-6}$ mmoles platinum, enough for 100,000 turnovers) was added and the reaction stirred under 80 C for 1 h. After volatiles removal sample analysis by FTIR and $^1$H NMR revealed about half completion so more Karstedt's catalyst (0.638 mL of a 100× dilution or 7.21×10$^{-4}$ mmoles platinum, enough for 1000 turnovers) was added and the reaction solution heated at 80 C overnight. After being heated for another 16 hours a sample of the reaction solution was prepared for analysis which determined that the silane had been consumed. The volatiles were removed by vacuum transfer to leave the product as a slightly yellow oil. The product used in the synthesis of the hexaamine product 4 without further purification.

Synthesis of Heptacyclohexyl POSS Hexaamine (4). A flask 50 mL Schlenk flask containing the hexaester product (about 240 mmoles) was attached to the Schlenk line and toluene (2 mL) and methanol (2 mL) were added. Then 1,2-diaminoethane (0.433 g, 0.481 mL, 7.20 mmoles) was added and the reaction flask heated on an oil bath set to 60 C overnight. The volatiles were removed from a sample of the reaction solution for analysis by FTIR and 1H NMR that determined the ester had been consumed in the reaction. The volatiles were removed by vacuum transfer, the white waxy solid divided into small chunks and placed under vacuum. The final product 4 contained some 1,2-diaminoethane.

Analysis of Allyl Diester. $^1$H NMR (toluene-d$_8$, δ): 2.05 to 2.25 (m, 2 H, CH$_2$CH$_2$CH(CO$_2$H)CH$_2$CO$_2$H), 2.5 to 2.65 (m, 1 H, CH$_2$CH$_2$CH(CO$_2$H)CH$_2$CO$_2$H), 2.75 to 2.90 (m, 1 H, CH$_2$CH$_2$CH(CO$_2$H)CH$_2$CO$_2$H), 3.33, 3.38 (s, 6 H, OMe), 4.80 to 4.95 (m, 2 H, CH$_2$=CHCH$_2$), 5.45 to 5.65 (m, 1 H, CH$_2$=CHCH$_2$). IR (cm$^{-1}$, diamond): 2953 m (sp3 C—H), 1731 (s, ester C=O), 1436 m, (sp3 C—H), 1195 sh, 1159 s (ester OMe).

Analysis of Heptacyclohexyl POSS Trisilane (2). $^1$H NMR (toluene-d$_8$, δ): 0.27 (s, 18H, SiMe), 0.70 to 2.00 (3 broad m, 77H, cyclohexyl), 4.75 (s, 3 H, Si—H). IR (cm$^{-1}$, diamond): 2919 s, 2847 s (sp3 C—H), 2137 m, (Si—H), 1445 m, (sp3 C—H), 1107 sh, 1078 sh, 1054 s, 1035 sh (cage Si—O—Si).

Analysis of Heptacyclohexyl POSS Hexaester (3). $^1$H NMR (toluene-d$_8$, δ): 0.45 (s, 18 H, SiMe), 0.65 to 0.80 (m, 6 H, SiCH$_2$CH$_2$), 0.85 to 2.20 (broad m, 89 H, cyclohexyl, SiCH$_2$CH$_2$CH$_2$CH), 2.25 to 2.35 & 2.65 to 2.80 (m, 6 H, CH$_2$CH(CO$_2$H)CH$_2$CO$_2$H), 2.95 (m, 3 H, CH$_2$CH(CO$_2$H)CH$_2$CO$_2$H). IR (cm$^{-1}$, diamond): 2920 m, 2848 m (sp3 C—H), 1737 m (ester C=O), 1446 m (sp3 C—H), 1111 sh, 1078 s, 1050 s, 1035 sh (cage Si—O—Si).

Analysis of Heptacyclohexyl POSS Hexaamine (4). IR (cm$^{-1}$, diamond): 3354 sh, 3288 w (NH), 2919 s, 2847 m (sp3 C—H), 1658 m, (amide C=O), 1445 m (sp3 C—H), 1103 sh, 1078 sh, 1057 s, 1025 sh (cage Si—O—Si). MALDI TOF MS (m/z): 313.5 (M)$^{+6}$, 376.0 (M)$^{+5}$, 394.5 (M+4Na)$^{+5}$, 469.8 (M)$^{+4}$, 454.7 (M+Na)$^{+4}$, 625.7 (M)$^{3+}$, 665.8 (M+4Na)$^{+3}$, 938.0 (M)$^{+2}$, 1875.0 (M)$^{+1}$.

Example 2

Preparation of Isooctyl-Hexamine Quantum-Dot Binding Ligand

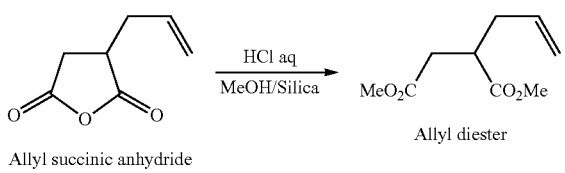

Allyl succinic anhydride → Allyl diester

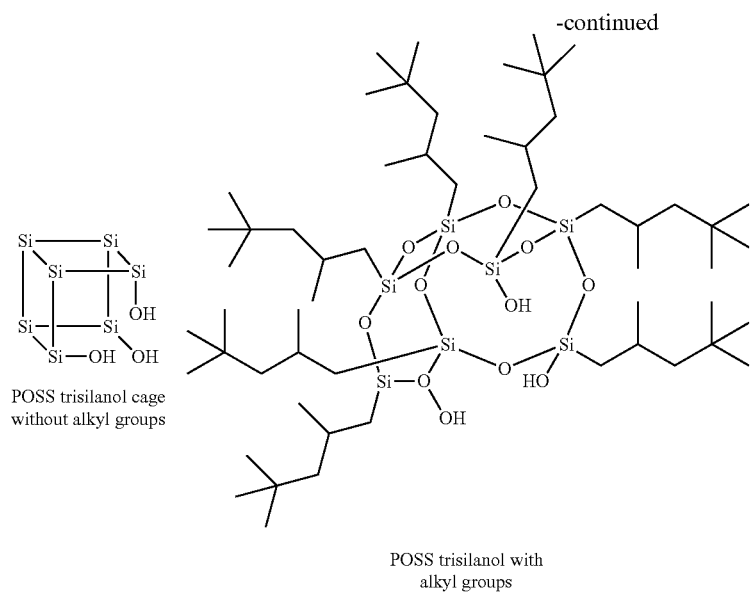

POSS trisilanol cage without alkyl groups

POSS trisilanol with alkyl groups

Where the poss trisilanol cage is represented by the symbol

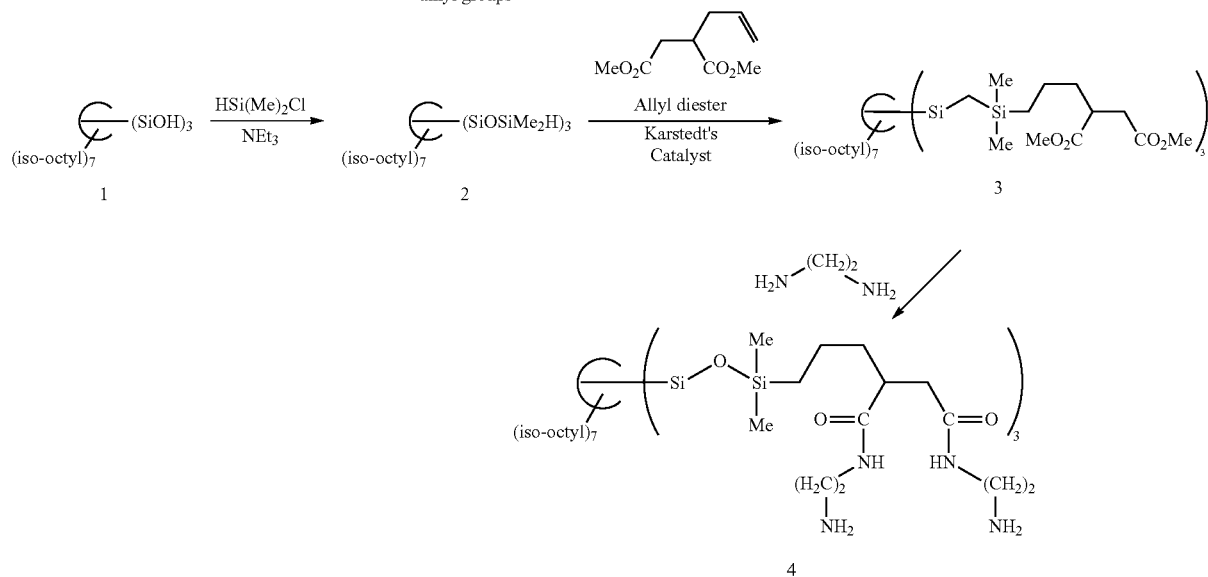

General Methods. All manipulations were performed under a dry, oxygen-free, nitrogen atmosphere using standard Schlenk technique. Dry, deoxygenated toluene was purchased from Fisher and used without further purification. Dry, deoxygenated dimethoxyethane (DME), triethyl amine and dimethyl chloro silane were purchased from Aldrich and used without further purification. Heptaisooctyl POSS trisilanol, 85 to 90%, was purchased from Hybrid Plastics and used without further purification. The synthesis of allyl diester was described in other patents from Nanosys. NMR chemical shift data were recorded with a Bruker FT NMR at 400 MHz for proton or 100 MHz for $^{13}C$ {$^{1}H$} and are listed in ppm. IR analysis was obtained on a Nicolet 7200 FTIR equipped with an attenuated total reflectance (ATR) sampling accessory.

Synthesis of Heptaisooctyl POSS Trisilane (2). A 500 mL, 4-neck RBF was added heptaisooctyl POSS trisilanol 1 (10.0 g, 8.44 mmoles) and the flask was fitted with equipped with a nitrogen inlet adapter, distillation head with receiver and thermocouple. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also, the one way valve on the bubbler allowed vacuum to be applied to the whole apparatus, from the bubbler to the hose adapter. The thermocouple was attached to a heating mantle with temperature controller to maintain the desired reaction solution temperature. The apparatus was placed under vacuum to a pressure of less than 100 mtorr before being back flushed with nitrogen. This vacuum step was preformed with the valve between the distillation head and bubbler open.

Then toluene (300 mL) was added, the receiver was cooled in a dry ice/ethanol bath and the reaction flask was heated to 100 C while nitrogen was passed across the surface of the reaction solution from the inlet adapter and out through the distillation head and bubbler. After collection of about 150 mL of distillate the heat was removed to allow the reaction solution to approach room temperature. Upon cooling toluene (40 mL) was added to allow the reaction solution to stir easily. Then dimethyl chloro silane (3.20 g, 3.75 mL, 33.8 mmoles) was added followed by triethyl amine (3.42 g, 4.71 mL, 33.8 mmoles) which turned the reaction solution opaque white and almost solidified. Toluene (40 mL) was added which allowed the reaction solution to stir freely again. It was heated to 50 C for about 1 minute before cooling to room temperature. The volatiles were removed by vacuum transfer using a supplementary trap cooled with dry ice ethanol.

The thick white paste was extracted with hexanes (1×60 mL & 2×20 mL) and the extracts were transferred individually to a separate flask using a filter tipped cannula equipped with Whatman 5 filter paper (with <2.5 um particle retention). The volatiles were removed from the clear colorless solution to leave the product 2 as a clear, slightly amber oil (9.77 g, 7.19 mmoles, 85.2% yield).

Synthesis of Heptaisooctyl POSS Hexaester (3). In the glove box trisilane 3 (3.0 g, 2.21 mmoles) was added to a 25 mL, 3-neck RBF that was equipped with a nitrogen inlet adapter and two stoppers. Then on the vacuum line the stoppers were replaced with a thermocouple positioned to measure the reaction solution temperature. A nitrogen filled reflux condenser replaced the other stopper. Toluene (1.0 mL) was added and the reaction solution heated to 100 C before Karstedt's catalyst (0.586 mL of a 10× dilution or $6.62 \times 10^{-3}$ mmoles, enough for 1000 turnovers) was added. Following the initial exotherm to 120 C the reaction solution was allowed to cool to 100 C before being maintained at 100 C overnight. Analysis by FTIR and $^1$H NMR of a sample of the reaction solution, prepared by removal of the volatiles, determined the reaction had gone to completion. The reaction product was sent to the next step without purification.

Synthesis of Heptaisooctyl POSS Hexaamine (4). To the reaction solution from the previous step was added 1,2-diaminoethane (2.39 g, 2.66 mL, 39.7 mmoles) and the solution was heated to 120 C overnight. After being heated for 16 h, analysis of a sample by FTIR and $^1$H NMR revealed that the starting ester had almost been consumed so toluene was added (5 mL) and the reaction solution heated at 120 C overnight again. Analysis by FTIR determined that the ester has been consumed so the volatiles are removed by vacuum transfer to leave a clear amber oil.

Analysis of Heptaisooctyl POSS Trisilane (2). $^1$H NMR (CDCl$_3$, δ): 0.24 (m, 18 H, SiMe), 0.45 to 1.40 (broad m, 119 H, isooctyl), 4.78 (m, 3 H, Si—H). IR (cm$^{-1}$, diamond): 2952 m, 2904 sh, 2867 sh (sp3 C—H), 2147 m (Si—H), 1475 w (sp3 C—H), 1086 sh, 1051 s (Si—O—Si).

Analysis of Heptaisooctyl POSS Hexaester (3). $^1$H NMR (toluene-d$_8$, δ): 0.40 (s, 18H, SiMe), 0.70 to 1.55 (broad m, 137 H, isooctyl & SiCH$_2$CH$_2$CH$_2$CH), 2.25 to 2.35 & 2.70 to 2.77 (two m, CH$_2$CH(CO$_2$Me)CH$_2$(CO$_2$Me), 2.90 to 3.05 (m, 1H, CH$_2$CH(CO$_2$Me)CH$_2$(CO$_2$Me), 3.35 & 3.45 (two s, 18 H, OMe). IR (cm$^{-1}$, diamond): 2951 m, 2094 sh, 2867 sh (sp3 C—H), 1742 m (ester C=O), 1467 w, (sp3 C—H), 1086 sh, 1046 s (Si—O—Si).

Analysis of Heptaisooctyl POSS Tetraamine (4). $^1$H NMR (toluene-d$_8$, δ): 0.30 to 0.65 (m, 18 H, SiMe), 0.70 to 1.70 (broad m, 131 H, isooctyl & SiCH$_2$CH$_2$CH$_2$CH), 1.95 to 2.45 (m, 9 H, CH$_2$CH(CO$_2$H)CH$_2$CO$_2$H), 2.70 to 3.85 (m, 24 H, NHCH$_2$CH$_2$NH$_2$), 8.5 to 9.5 (m, 12H, CH$_2$NH$_2$). IR (cm$^{-1}$, diamond): 3291 broad w, (NH), 2951 m, 2094 sh, 2867 sh (sp3 C—H), 1646 (m, amide C=O), 1082 sh, 1054 s (Si—O—Si).

Example 3

Preparation of Isooctyl-Carboxylic Acid Quantum-Dot Binding Ligand

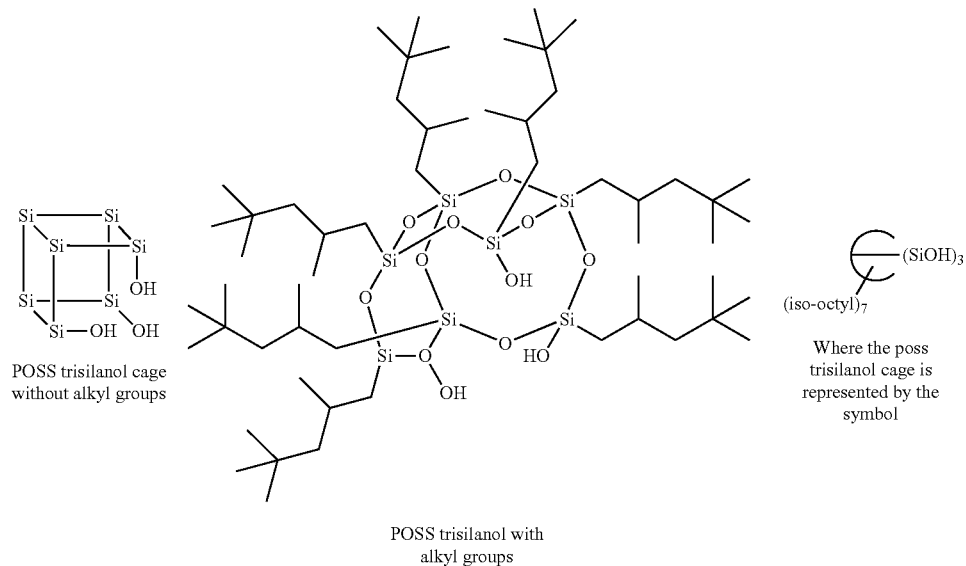

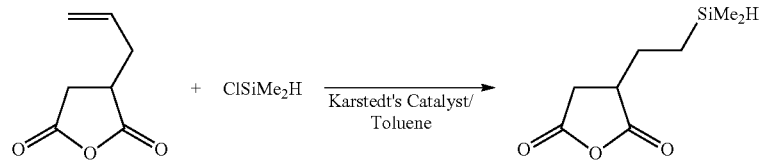

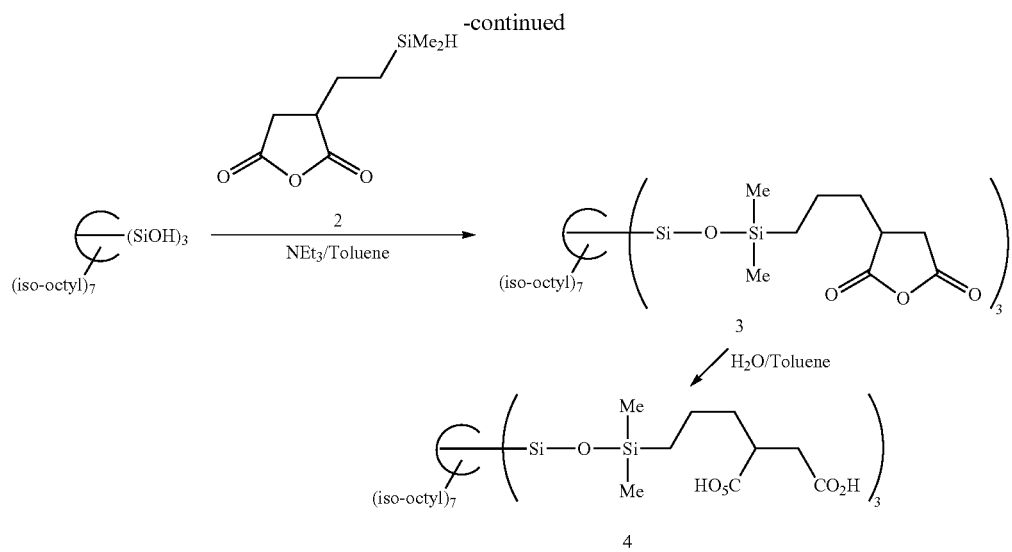

General Methods. All manipulations were performed under a dry, oxygen-free, nitrogen atmosphere using standard Schlenk technique. Dry, deoxygenated toluene and hexanes were purchased from Fisher and used without further purification. Dry, deoxygenated dimethoxyethane (DME) was purchased from Aldrich and used without further purification. Heptaisooctyl POSS trisilanol 1, 85 to 90%, was purchased from Hybrid Plastics and used without further purification. Allyl succinic anhydride was purchased from TCI America and distilled before use. Chloro dimethyl silane and triethyl amine were purchased from Aldrich and stored in the glove box before use. Karstedt's catalyst, 2.1 to 2.4 wt % in xylenes was obtained from Gelest, used without further purification, stored and handled inside the glove box. A 100× dilution of Karstedt's catalyst was produced by dissolving 0.10 mL of stock solution into 10 mL of toluene. (The stock solution contains 0.113 moles of platinum per mL.) NMR chemical shift data were recorded with a Bruker FT NMR at 400 MHz for proton or 100 MHz for $^{13}C\{^1H\}$ and are listed in ppm. IR analysis was obtained on a Nicolet 7200 FTIR equipped with an attenuated total reflectance (ATR) sampling accessory.

Synthesis of Succinic Anhydride Silane (2). To a 50 mL, 4-neck RBF equipped with a reflux condenser, nitrogen inlet adapter and thermocouple attached to the Schlenk line as added allyl succinic anhydride (10.0 g, 8.55 mL, 71.4 mmoles) and chloro dimethyl silane (13.5 g, 15.8 mL, 142 mmoles). Then upon complete mixing Karstedt's catalyst (0.316 mL, of a 10× dilution or 3.57×10$^{-3}$ mmoles, enough for 20,000 turnovers) was added and after exothermic heating to 30 C the temperature was maintained at 40 C for 3 h. The reaction solution was sampled and the volatiles removed by vacuum transfer to prepare for analysis. FTIR and $^1$H NMR determined the silane had been consumed. The volatiles were removed by vacuum transfer overnight using a supplementary trap cooled with dry ice/EtOH. The residue was extracted with hexanes (3×30 mL) and the extracts transferred by filter tip cannula equipped with Fisherbrand P8 filter paper (particle retention 20-25 um) individually. The volatiles were removed bby vacuum transfer and the remaining oil distilled trap-to-trap with an oil bath at 150 C and a pressure of less than 250 mtorr. The product was a clear colorless oil 16.8 g, 7.14 mmoles, quant yield).

Synthesis of Heptaisooctyl POSS Tetracarboxylic acid (4). A 250 mL, 4-neck RBF equipped with nitrogen inlet adapter (Teflon valve/stopper), thermocouple positioned to measure reaction solution temperature directly (with temperature controller) and short path distillation head with receiver was attached to the Schlenk line. Additionally the distillation head was attached to a bubbler containing a one-way valve. The apparatus was configured so that upon attachment of a Schlenk line to the hose adapter, nitrogen gas could be passed into the reaction flask, across the surface of the reaction solution and out the bubbler attached to the distillation head. Also the one way valve on the bubbler allowed vacuum to be applied to the whole apparatus from the bubbler to the hose adapter. Then heptaisooctyl POSS trisilanol 1 (8.14 g, 6.87 mmoles of silane) was added and the apparatus was placed under vacuum to a pressure of less than 100 mtorr. Toluene (100 mL) was added and nitrogen was passed through the apparatus while the reaction solution was heated to 70 C and the toluene was distilled off. The succinic anhydride silane 2 (5 g, 21.3 mmoles) was added and upon forming a homogenous solution triethyl amine (8.43 g, 11.5 mL, 82.4 mmoles) was added which produced some white precipitate. As the reaction solution was heated to 50 C and the more precipitate was formed so the reaction solution was heated to 70 C for 30 minutes before being sampled for analysis. FTIR analysis after removal of the volatiles determined the loss of Si—Cl and Si—OH peaks, so the reaction was considered complete. The volatiles were removed from the reaction solution by vacuum transfer overnight using a supplementary trap cooled with dry ice/ethanol. Then the remaining residue was extracted with hexanes (1×50 mL, 2×30 mL) and the extracts transferred to a separate flask using a filter tip cannula equipped with Fisherbrand P8 filter paper (particle retention 20-25 um) individually. The volatiles were removed from the hexane extracts by vacuum transfer overnight using a supplementary trap cooled with dry ice/ethanol to leave the product as a clear oil.

Analysis of Succinic Anhydride Silane (2). $^1$H NMR (toluene-d$_8$, δ): 0.26 (s, 6 H, SiMe), 0.52 (m, 2 H, SiCH$_2$), 1.18 (m, SiCH$_2$CH$_2$), 1.56 (m, SiCH$_2$CH$_2$CH$_2$), 2.01, 2.40 (two m, 3 H, SiCH$_2$CH$_2$CH$_2$CHCH$_2$). $^{13}$C $\{^1$H$\}$ NMR (toluene-d$_8$, δ): 1.4 (s, SiMe), 18.3, 20.8, 33.7, 33.8, 40.2 (s, (SiCH$_2$CH$_2$CH$_2$CH(CO$_2$H)CH(CO$_2$H)), 170.4, 173.9 (s, C=O). IR (cm$^{-1}$, diamond): 2944 w, 2968 sh (sp3 C—H), 1862 m, 1774 s (symm. & asymm. anhydride C=O), 464 m, (Si—Cl).

Analysis of Heptaisooctyl POSS Trianhydride (3). IR (cm$^{-1}$, diamond): 2952 m, 2905 sh, 2872 sh (sp3 C—H), 1864 w, 1782 s (symm. & asymm. anhydride C=O), 1095 sh, 1058 s (POSS cage Si—O—Si).

Analysis of Heptaisooctyl POSS Tetracarboxylic Acid (4). $^1$H NMR (toluene-d$_8$, δ): 0.15 to 0.60 (m, 38 H, SiMe, SiCH$_2$CH$_2$), 0.70 to 1.85 (m, 117 H, isooctyl exept SiCH$_2$, SiCH$_2$CH$_2$CH$_2$CH), 2.20 to 2.35 & 2.65 to 2.80 (m, 6 H, CH$_2$CH(CO$_2$H)CH$_2$CO$_2$H), 2.85 to 3.00 (m, 3 H, CH$_2$CH(CO$_2$H)CH$_2$CO$_2$H), 10.1 to 11.2 (broad m, 6 H, CO$_2$H). Also contains hexane. IR (cm$^{-1}$, diamond): 3500 to 2500 w broad (carboxylic acid), 2951 m, 2909 sh, 2868 sh (sp3 C—H), 1708 s (carboxylic acid C=O), 1095 sh, 1054 s (POSS Si—O—Si).

Example 4

Preparation of Cyclohexyl-Carboxylic Acid Quantum-Dot Binding Ligand

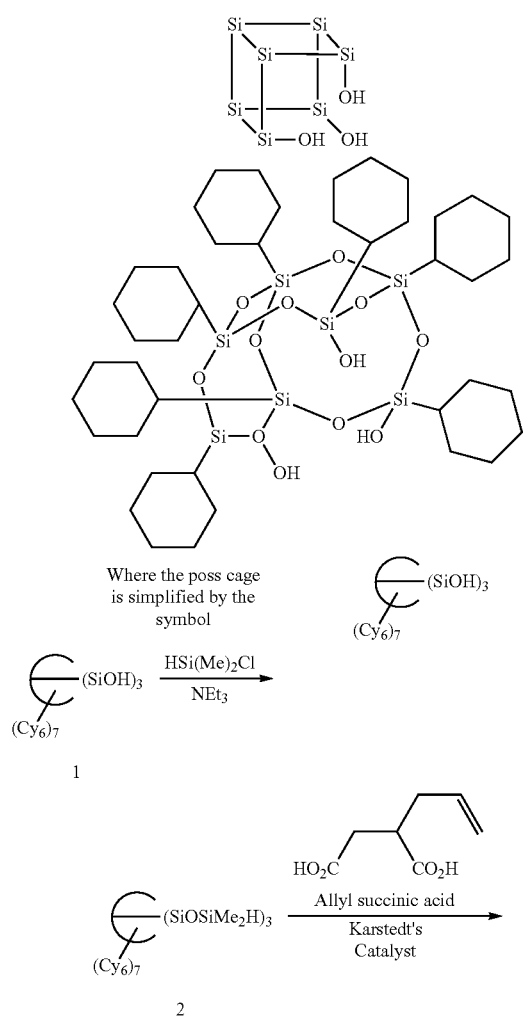

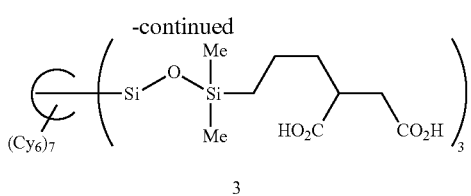

3

General Methods. All manipulations were performed under a dry, oxygen-free, nitrogen atmosphere using standard Schlenk technique. Dry, deoxygenated toluene was purchased from Fisher and used without further purification. Dry, deoxygenated dimethoxyethane (DME) was purchased from Aldrich and used without further purification. Karstedt's catalyst, 2.1 to 2.4 wt % in xylenes was obtained from Gelest, used without further purification, stored and handled inside the glove box. A 100× dilution of Karstedt's catalyst was produced by dissolving 0.10 mL of stock solution into 10 mL of toluene. (The stock solution contains 0.113 moles of platinum per mL.) The synthesis of heptacyclohexyl POSS trisilane 2 and allyl succinic anhydride were described in an earlier patent. NMR chemical shift data were recorded with a Bruker FT NMR at 400 MHz for proton or 100 MHz for $^{13}$C {$^1$H} and are listed in ppm. IR analysis was obtained on a Nicolet 7200 FTIR equipped with an attenuated total reflectance (ATR) sampling accessory.

Synthesis of Heptacyclohexyl POSS Hexacarboxylic Acid (3). In the glove box heptacyclohexyl POSS trisilane 2 (3 g, 2.62 mmoles) and allyl succinic acid (1.28 g, 8.10 mmoles) were added to a 50 mL, 4-neck RBF that was equipped with nitrogen adapter with valve, thermocouple and stopper. The thermocouple was attached to a heating mantle with temperature controller to maintain the desired reaction solution temperature. Then on the Schlenk line DME (2 mL) and toluene (1 mL) were added which formed a white opaque slurry when heated to 60 C. Then Karstedt's catalyst (0.346 mL of a 100× dilution or 3.91×10$^{-4}$ mmoles, enough for 20,000 turnovers) was added and the reaction solution heated at 100 C for 3 days. After vacuum transfer of volatiles FTIR analysis determined the silane had been consumed. The reaction solution was cooled to room temperature and added to MeOH (60 mL) which caused the product to precipitate. Then the reaction flask rinsed with toluene (1×2 mL & 1×1 mL) and the rinse solutions were also added to MeOH. After allowing the precipitate to settle for 5 minutes the solution was filtered with a filter tip cannula equipped with Fisherbrand P8 filter paper (particle retention 20 to 25 um), the white precipitate washed with MeOH (20 mL) and then the wash solution was removed by cannula as well. It was placed under vacuum overnight.

The FTIR analysis also revealed that the product contained some anhydride. Water (7.1 mL, 391 mmoles) was added and the reaction solution was heated to 100 C, with thermocouple between the heating mantle and flask, for 7 h. The reaction solution was cooled to room temperature before having the volatiles removed by vacuum transfer using a supplementary trap cooled with dry ice/ethanol. The solids were broken up and the product vacuumed to p<50 mtorr overnight. The product is a slightly off-white powder 1.53 g, 0.943 mmoles, 35.2% yield.

Analysis of Heptacyclohexyl POSS Hexacarboxylic Acid (3). IR (cm$^{-1}$, diamond): 3500 to 2500 w broad (carboxylic acid), 2921 w, 2848 w (sp3 C—H), 1709 w (carboxylic acid C=O), 1447 w, (sp3 C—H), 1070 s, 1024 sh (POSS Si—O—Si).

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A quantum dot binding-ligand having a structure according to Formula I

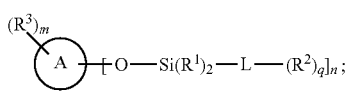

wherein:
A is a polyhedral oligomeric silsesquioxane (POSS) moiety comprising 6 to 12 silicon atoms;
each group —O—Si($R^1$)$_2$-L-($R^2$)$_q$ is bound to a silicon atom in the POSS moiety;
each $R^1$ is independently selected from the group consisting of H and $C_{1-6}$alkyl;
each L is independently selected from the group consisting of $C_{3-8}$alkylene, $C_{3-8}$heteroalkylene, and $C_{3-8}$alkylene-(C(O)NH—$C_{2-8}$ alkylene)$_q$;
each $R^2$ is independently selected from the group consisting of C(O)OH and $NR^{2a}R^{2b}$, wherein $R^{2a}$ and $R^{2b}$ are each independently selected from the group consisting of H and $C_{1-6}$alkyl;
each $R^3$ is independently selected from the group consisting of $C_{8-20}$alkyl, $C_{8-20}$heteroalkyl, $C_{8-20}$alkenyl, $C_{8-20}$alkynyl, cycloalkyl, and aryl;
the subscript m is an integer from 1 to 20;
the subscript n is an integer from 1 to 20; and
each subscript q is independently an integer from 2 to 10.

2. The quantum dot binding-ligand according to claim 1, wherein each $R^1$ is independently $C_{1-3}$ alkyl.

3. The quantum dot binding-ligand according to claim 1, wherein each $R^1$ is methyl.

4. The quantum dot binding-ligand according to claim 1, wherein each -L-($R^2$)$_q$ group is independently selected from the group consisting of $C_{3-8}$alkylene-($R^2$)$_2$, and $C_{3-8}$alkylene-(C(O)NH—$C_{2-8}$alkylene-($R^2$)$_2$.

5. The quantum dot binding-ligand according to claim 1, wherein each -L-($R^2$)$_q$ group is independently selected from the group consisting of:

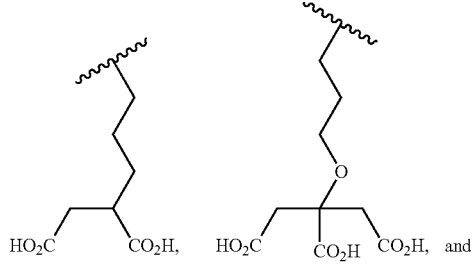

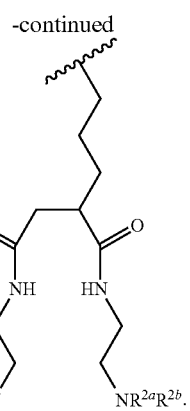

6. The quantum dot binding-ligand according to claim 1, wherein each $R^2$ is C(O)OH.

7. The quantum dot binding-ligand according to claim 6, wherein each L is $C_{3-8}$alkylene.

8. The quantum dot binding-ligand according to claim 6, wherein each -L-($R^2$)$_q$ group is:

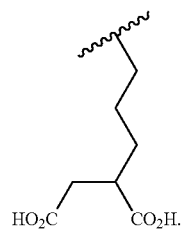

9. The quantum dot binding-ligand according to claim 1, wherein each $R^2$ is $NH_2$.

10. The quantum dot binding-ligand according to claim 9, wherein each L is independently $C_{3-8}$ alkylene-(C(O)NH—$C_{2-8}$alkylene)$_q$; and
each subscript q is 2.

11. The quantum dot binding-ligand according to claim 10, wherein each -L-($R^2$)$_q$ group is:

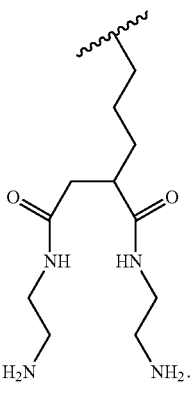

12. The quantum dot binding-ligand according to claim 1, wherein each $R^3$ is independently selected from the group consisting of octyl, isooctyl, nonyl, decyl, undecyl, dodecyl, tridecyl, tetradecyl, pentadecyl, hexadecyl, heptadecyl, octadecyl, nonadecyl, icosyl, cyclopentyl, cyclohexyl, cyclooctyl, norbornyl, adamantyl, phenyl, naphthyl, and anthracenyl.

13. The quantum dot binding-ligand according to claim 1, wherein $R^3$ is selected from the group consisting of cyclohexyl, phenyl, and isooctyl.

14. The quantum dot binding-ligand according to claim 1, wherein the subscript m is an integer from 5 to 10.

15. The quantum dot binding-ligand according to claim 1, wherein the subscript m is 7.

16. The quantum dot binding-ligand according to claim 1, wherein the subscript n is an integer from 1 to 6.

17. The quantum dot binding-ligand according to claim 1, wherein the subscript n is 3.

18. The quantum dot binding-ligand according to claim 1, wherein the POSS moiety has the following structure:

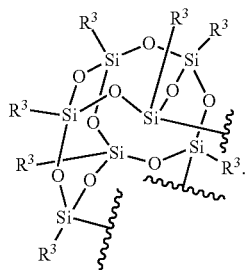

19. The quantum dot binding-ligand according to claim 18, wherein:

each $R^1$ is methyl;
each -L-$(R^2)_q$ group is selected from the group consisting of:

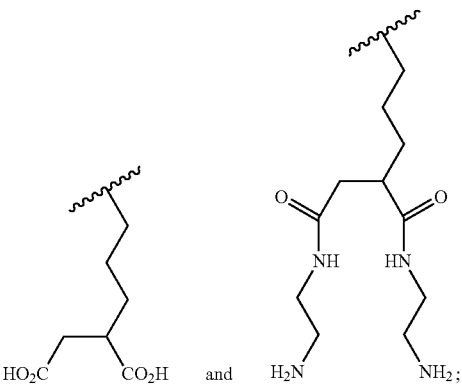 [SMILES: *CCCC(CC(=O)O)C(=O)O ; *CCCC(CC(=O)NCCN)C(=O)NCCN]

each $R^3$ is selected from the group consisting of cyclohexyl, phenyl, and isooctyl;
the subscript m is 7; and
the subscript n is 3.

20. A composition comprising:
a quantum dot binding-ligand of claim 1; and
a first population of light emitting quantum dots (QDs).

* * * * *